Nov. 11, 1958 J. R. HEFELE 2,860,186

TELEVISION TRANSMISSION CHANNEL SHARING SYSTEM

Filed July 6, 1954 2 Sheets-Sheet 1

INVENTOR
J. R. HEFELE
BY
ATTORNEY

TELEVISION TRANSMISSION CHANNEL SHARING SYSTEM

Filed July 6, 1954 2 Sheets-Sheet 2

INVENTOR
J. R. HEFELE
BY J. M. Wetzel
ATTORNEY

United States Patent Office 2,860,186

Patented Nov. 11, 1958

2,860,186

TELEVISION TRANSMISSION CHANNEL SHARING SYSTEM

John R. Hefele, Yonkers, N. Y., assignor to Bell Telephone Laboratories, Incorporated, New York, N. Y., a corporation of New York Application July 6, 1954, Serial No. 441,195

13 Claims. (Cl. 179—15)

This invention relates to a transmission and reproduction system for electric communication signals and particularly for television image signals.

One object of the invention is to make more efficient use of the frequency band now required to transmit a single television video signal.

Another object of the invention is to effect a substantial reduction in the period of use of the frequency band required for the transmission of television signals as compared with the period required where transmission is in accordance with the methods now commonly in use.

A further object of the invention is to devise new and improved means to permit more than one television video signal to share a frequency band now required to transmit a single television video signal.

The frequency band and picture repetition rate required for the transmission and reproduction of satisfactory television images is determined by properties of the human eye and the departure from perfection which an observer regards as tolerable. Hence, the band must be sufficiently wide to provide brightness information representative of coarse and fine image detail for reproducing a picture acceptable to the eye, and the picture repetition must be sufficiently frequent to eliminate substantially all brightness flicker. The accepted standards for present day television systems require that the signal occupy a bandwidth of four megacycles and that pictures be transmitted at the rate of thirty frames per second.

The four megacycle band has been chosen so that all of the necessary picture information, both the coarse and the fine, the former being represented by the low frequencies and the latter by the high frequencies, can be carried simultaneously. Of this information the coarse image information must be provided more frequently because it determines the image sense of the picture, and the fine detail information which adds tone to the coarse image picture sufficient to make the picture acceptable to the eyes need be provided less frequently. Moreover, though the thirty frame per second repetition rate has been chosen so as to eliminate brightness flicker, it is known that from the viewpoint of smoothness of subject action acceptable reproduction can be achieved with pictures presented at a much lower frame repetition rate. Thus, it is clear that transmission of the high frequency components of the video signal at a repetition rate of thirty frames per second is not a requisite for a reproduced scene which is acceptable to the fine acuity demands of the eye. It is this realization which is utilized as hereinafter described to achieve the objects of the invention.

In an exemplary embodiment of the present invention a complete video signal is divided into two transmission paths one of which contains a low pass filter so that the low frequency components, only, of the signal are transmitted therethrough. A switching means controlled, for example, by the frame synchronizing signal is connected to the two transmission paths to apply to a standard television frequency channel during one period both low and high frequency components of the video signal and during a subsequent period just the low frequency components of the video signal.

A second complete video signal treated in the same manner may be combined by additional switching means with the first video signal so that the low frequency components of the first signal are continuously transmitted and the high frequency components of the first signal and the high frequency components of the second signal are alternately transmitted on a time sharing basis, all over a standard television frequency channel. By further applying frequency-interlacing techniques to the low frequency components of the first and second video signals (in the range where crosstalk is minimum and hence frequency interlacing practical) both complete video signals can be transmitted over a single four megacycle frequency channel, that is, the channel now normally used for the transmission of a single television video signal.

At the receiving stations the signals may be passed through appropriate filter and switching means which will separate the various picture components transmitted and recombine them into two separate television pictures.

One obvious and important advantage of such a system is that more than a single television video signal may be sent over facilities heretofore required for just one video signal, thereby making possible substantial economies in the transmission of television signals.

The invention will be more fully understood from the following detailed description of certain illustrative embodiments thereof taken in connection with the accompanying drawings in which.

Figure 1:
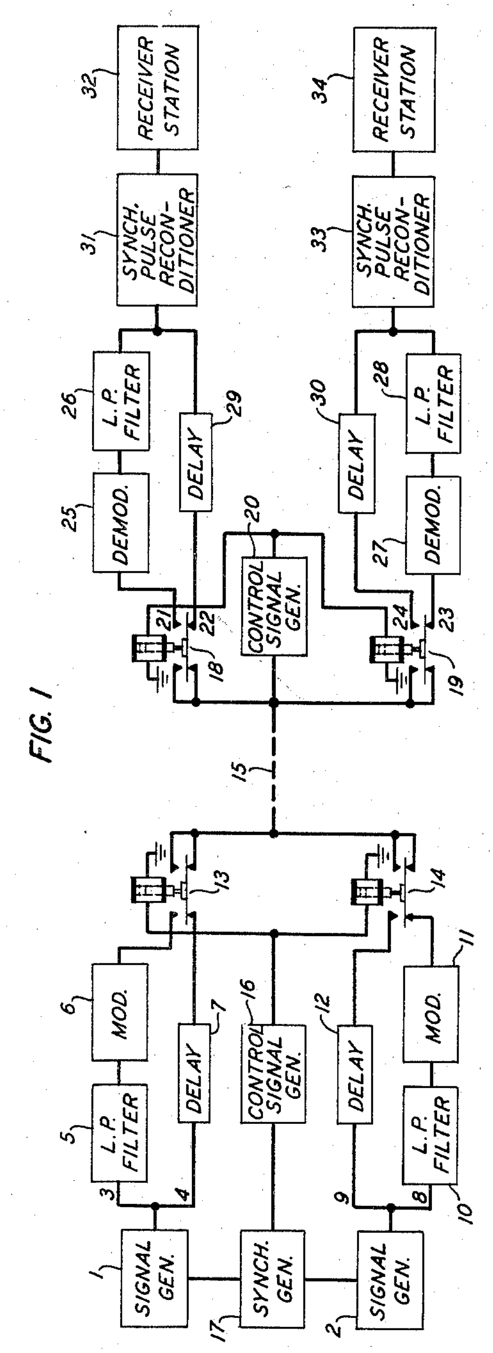
Fig. 1 shows an overall block diagram of an exemplary embodiment of a television channel-sharing system in accordance with the invention in which two video signals are sent over a single television channel.

Referring specifically to Fig. 1, there is shown therein a television channel-sharing system in accordance with the invention utilizing time-sharing and frequency-interlacing techniques. In this embodiment a video signal from picture generator 1 and a video signal from picture generator 2, both of which generators may be camera chains, for example, are transmitted over a transmission channel that is normally required for a single television video signal. The video signal from generator 1 is split at the transmitting terminal into two transmission paths 3 and 4, path 3 including a low-pass filter 5 and a modulator 6 and path 4 including a delay means 7. The video signal from picture generator 2 is similarly split into two transmission paths 8 and 9, path 8 comprising a low-pass filter 10 and a modulator 11 and path 4 including a delay line 12. The signals from each pair of transmission paths are transmitted alternately, and applied through switches 13 and 14 to the communication channel 15. Switches 13 and 14 are two pole devices which are operated by signals from control signal generator 16 which is in turn triggered by vertical synchronizing signals from generator 17. Synchronizing generator 17 is also connected to supply synchronizing signals to picture generator 1 and picture generator 2. Hence, as shown in Fig. 1 during one given transmission period which, by way of example, may be a frame period, switch 13 is connected to transmission path 4 thereby applying the complete video signal from picture generator 1 to the communication channel 15 through a delay circuit 7. During the same period switch 14 is connected to transmission path 8 including filter 10 and modulator 11 through which the video signal from generator 2 is passed to the communication channel 15. In this manner the complete video signal from picture generator 1 and the low-frequency portion of the signal from picture generator 2 are both carried simultaneously on communication channel 15. To facilitate this transmission the low-frequency components of the signal from picture generator 2 passed by filter 10 are modulated by circuit 11 sufficiently to be interlaced with the low-frequency portion of the signal from picture generator 1. At a subsequent period switch 13 makes contact with transmission path 3 and switch 14 makes contact with transmission path 9. According to the method described above the complete video signal from picture generator 2 and the low-frequency components of the video signal from picture generator 1 are interlaced and transmitted over communication channel 15 during this subsequent period. To eliminate any phase discrepancy that may occur between the signals in the two paths of each pair of circuits, the device 7 inserts into path 4 a delay equal to that inserted into path 3 by filter 5 and modulator 6 and circuit 12 inserts into path 9 a delay equal to that inserted into path 8 by filter 10 and modulator 11.

Figure 2:
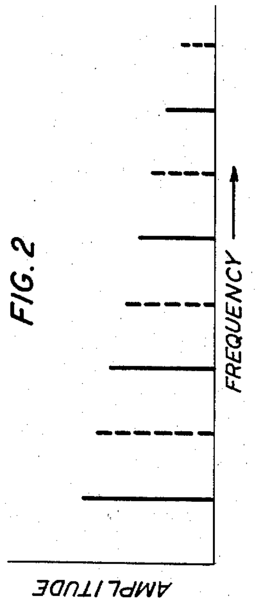
Fig. 2 is an amplitude-frequency diagram of energy concentration resulting from frequency interlacing of two video signals.

Frequency interlacing is achieved in a manner as described in Patent 1,769,920 to F. Gray. In television video signals the signal energy is largely concentrated in a number of distinct bands of frequencies between which there is very little useful energy and the position of the bands in the frequency spectrum is dependent upon the field scanning frequency and upon the line scanning frequency. The energy concentration resulting from scanning an ordinary field occurs in the regions of the field scanning frequency and some of the lower harmonics thereof and in the regions of the line scanning frequency and the lower harmonics thereof. These latter bands are made up of a plurality of frequencies the prominent ones of which differ by approximately the field scanning frequency. It is obvious that the frequency bands of energy concentrations of both video signals being considered are the same and to transmit both signals over the same frequency band channel, frequency interlacing techniques must be employed. In accordance with the technique disclosed in the above-mentioned patent modulation is utilized for shifting the frequency bands of picture energy of one video signal to gaps in the frequency bands of the other video signal as shown in Fig. 2. Here there is shown an amplitude frequency diagram of energy concentration of frequencies in two video signals which have been interlaced. The solid lines represent the frequency band energy concentration of a first video signal and the dashed lines represent the frequency band energy concentration of a second video signal which have been shifted in the above described manner to fit the low frequency gaps of the first video signal.

At the receiving terminal the signal transmitted by means of channel 15 is split into two paths and applied respectively to switches 18 and 19. These switches are operated by a control signal generator 20 identical to generator 16 which signal generator is triggered by synchronizing pulses derived from the signals transmitted in channel 15. Switches 18 and 19 are controlled to selectively apply the signals to one of two transmission paths associated with each. That is, switch 18 can make contact with path 21 or path 22 and switch 19 can make contact with path 23 or path 24. Path 21 includes demodulator 25 and low-frequency-band-pass filter 26, and path 23 includes demodulator 27 and filter 28. Transmission paths 22 and 24 include delay lines 29 and 30 respectively. The signals in paths 21 and 22 are applied to synchronizing pulse reconditioner 31 and thence to receiver station 32 while paths 23 and 24 are joined at the synchronizing pulse reconditioner 33 which is connected to receiver station 34. Receiver stations 32 and 34 may be, by way of example, local television picture receivers. At the receiving terminal the switches 18 and 19 are operated in synchronism with switches 13 and 14 at the transmitter so that during a given period the complete video signal from picture generator 1 transmitted over communication channel 15 is recovered in the receiver and applied to receiver station 32 and the low-frequency portion of the signal from picture generator 2 transmitted over channel 15 is recovered and applied on receiver station 34. By virtue of the arrangement in accordance with the invention described above, the signals recovered and displayed at receiver stations 32 and 34 in the receiver are always the equivalent of the signals transmitted respectively from picture generator 1 and picture generator 2.

Figure 3:
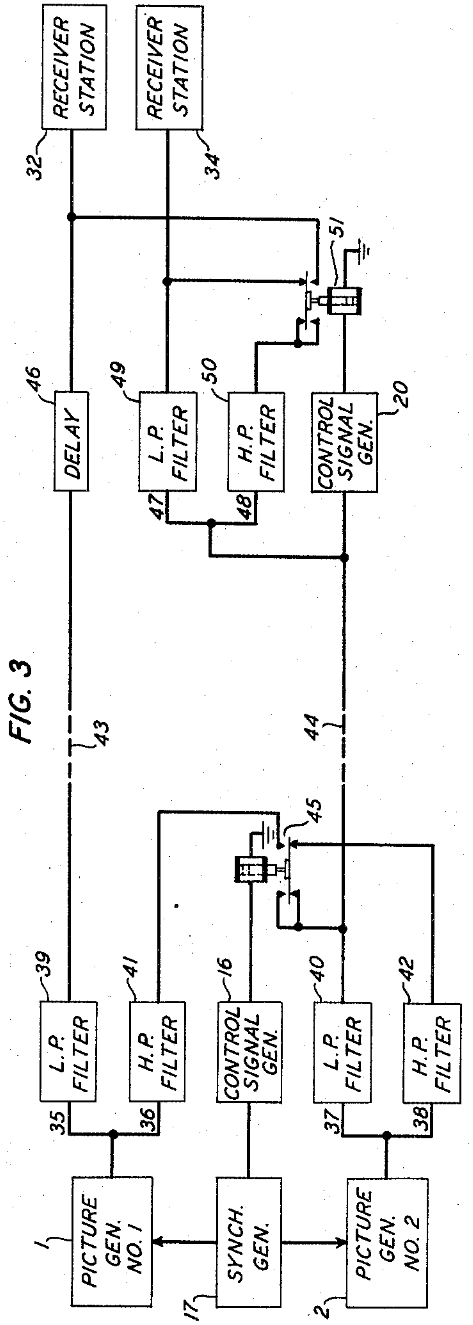
Fig. 3 is an overall block diagram of a second exemplary embodiment of the television channel-sharing system in accordance with the invention requiring more than a single television channel.

Another exemplary embodiment of the invention is shown in Fig. 3. This embodiment utilizing time-sharing techniques provides for the transmission of video signals from picture generator 1 and picture generator 2 over one standard wide-band television channel and one low-frequency channel. The signal from picture generator 1 is split into two transmission paths 35 and 36 and the signal from picture generator 2 is split into two transmission paths 37 and 38 at the transmitting terminal. Transmission paths 35 and 37 include, respectively, low-pass filters 39 and 40 and transmission paths 36 and 38 include, respectively, high-pass filters 41 and 42. The signal output from low-pass filter 39 is applied directly to a low-frequency transmission channel 43 and the signal output from low-pass filter 40 is applied directly to wide-band transmission channel 44. A switch 45, connected to wide-band transmission channel 44, is operated by means of generator 16 to successively apply output signals from high-pass filter 41 and high-pass filter 42 to channel 44.

At the receiving terminal the signal transmitted by means of channel 43 is applied directly to receiver station 32 through delay line 46. The signal from channel 44 is split into two paths 47 and 48 which contain respectively a low-pass filter 49 and a high-pass filter 50. The signal from low-pass filter 49 is applied directly to receiver station 34. The output signal from high-pass filter 50 is applied to switch 51 which is operated by generator 20 in synchronism with generator 16 to apply the high-frequency signals alternately to station receivers 32 and 34. According to the above-described embodiment, in accordance with the invention, it is possible by channel-sharing means to transmit two wide-band television video signals over means including but one wide-band standard television channel and another low-frequency band transmission channel.

Figure 4:
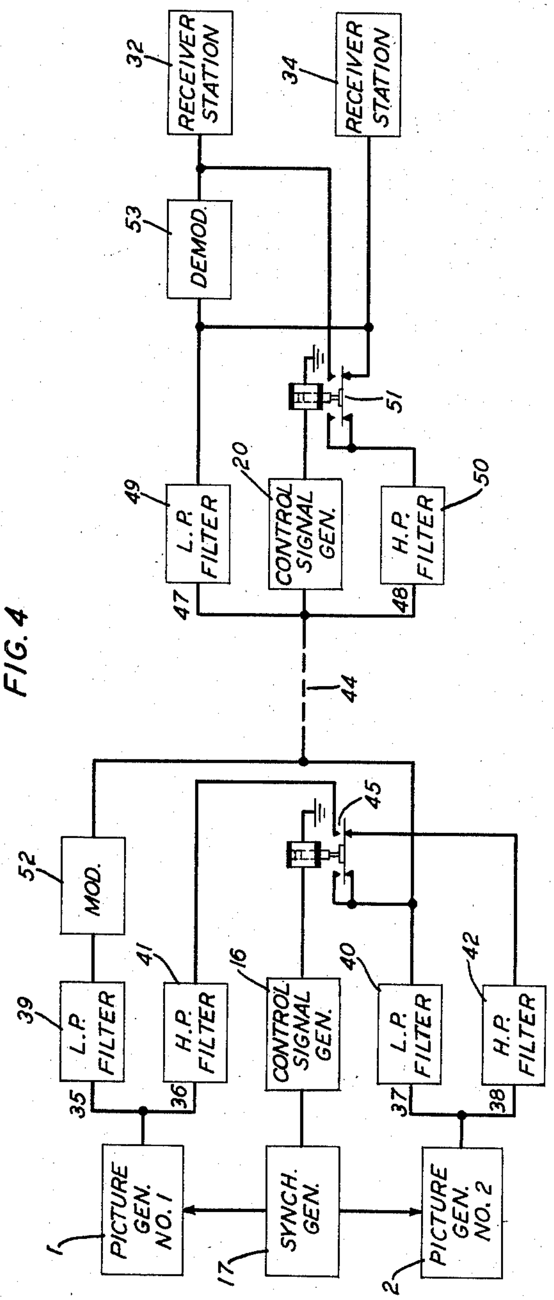
Fig. 4 is a block diagram of another embodiment of the television channel-sharing system in accordance with the invention utilizing the principles of the embodiments of Fig. 1 and Fig. 3.

A third embodiment of the invention utilizing principles of both of the preceding embodiments is shown in Fig. 4. The embodiment of Fig. 4 makes use of high-frequency time sharing principles of the embodiment of Fig. 3 and low-frequency interlacing principles of the embodiment of Fig. 1 whereby two television video signals may be transmitted over a single standard wide-band television channel. The transmission equipment of Fig. 4 is similar to that shown in Fig. 3 and the circuit elements therein which are identical to those of Fig. 3 are given the same reference numerals as in Fig. 3. The embodiment of Fig. 4 differs from that of Fig. 3 in that the signal output from low-pass filter 39 is applied through modulator 52 directly to channel 44. By this modulating step the low-frequency components of the signal from picture generator 1 transmitted through filter 39 are shifted in frequency sufficiently to permit interlacing with the low-frequency components of picture generator No. 2. The high-frequency components are treated substantially the same as in the embodiment of Fig. 3. At the receiver station the equipment is substantially the same as that in Fig. 3 with the exception that the unmodulated low-frequency signal from filter 49 is applied directly to picture reproducer 34 and the modulated signal is applied through demodulator 53 to receiver station 32. In this manner two television picture signals are transmitted over a single television channel and applied as two distinct picture signals at the receiver stations.

The above embodiments, described in terms of television video signals, are merely illustrative of the principles of the invention. Clearly these principles are equally adaptable to other forms of communication signals and to combinations of television video signals and other communication signals, and other embodiments and improvements thereof might easily be devised by those skilled in the art without departing from the spirit or scope of the invention.

What is claimed is:

1. A television transmission system comprising means for deriving from first and second video signals a pair of low frequency signals representative respectively of the coarse components of two television picture images and another pair of signals including the frequencies representative of the fine components of the television picture images, transmission means, and means for applying said pairs of signals to said transmission means in such manner that the low frequency portions of said video signals are transmitted simultaneously and the high frequency portions of said video signals are transmitted alternatively.

2. A television transmission system comprising means for deriving from a first video wave a first signal representative of the coarse components of a television picture image and a second signal including the frequencies representative of the fine components of the television picture image, means for deriving from a second video wave a third signal representative of the coarse components of another television picture image and a fourth signal including the frequencies representative of the fine components of said other televison picture image, transmission means, and switching means associated with said deriving means and connected to said transmission means in such a manner that signals representative of coarse components of the first and second video waves are transmitted simultaneously and continuously and the signals representative of the fine components of the first and second video waves are transmitted alternately over said transmission means.

3. A television transmission system comprising means at a transmitting station for deriving from a first video wave a first signal representative of the coarse components of a television picture image and a second signal including the frequencies representative of the fine components of the television picture image, means for deriving from a second video wave a third signal representative of the coarse components of another television picture image and a fourth signal including the frequencies representative of the fine components of said other television picture image, transmission means, switching means associated with said deriving means and connected to said transmission means whereby signals representative of coarse components of the first and second video wave are transmitted simultaneously and continuously and the signals representative of the fine components of the first and second video waves are transmitted alternately over said transmission means, means at a receiving station to receive said transmitted signals and present therefrom individual signals representative respectively of said first, second, third and fourth signals, and means for combining said first and second signals, and said third and fourth signals to form video waves representative, respectively, of said first video wave and said second video wave.

4. A television system comprising means at the transmitter station for applying a first video signal to a parallel pair of circuit means and a second video signal to another parallel pair of circuit means, one of said circuit means in each pair including a filter for passing frequencies representative of the coarse components of a television picture image, the other of said circuit means of each pair passing frequencies including those representative of the fine components of a television picture image, an electric signal means including switches for connecting said pairs of circuit means to a transmission channel, and means for controlling said switches in such a manner that signals representative of the coarse components are transmitted continuously over said channel and signals including those frequencies representative of the fine components are transmitted alternately over said channel.

5. A television system comprising means at the transmitter station for applying a first video signal to a parallel pair of circuit means and a second video signal to another parallel pair of circuit means, one of said circuit means in each pair including a filter for passing frequencies representative of the coase components of a television picture image, the other of said circuit means of each pair passing frequencies including those representative of the fine components of a television picture image, an electric signal means including switches for connecting said pair of circuit means to a transmission channel, means for controllig said switches whereby signals representative of the coarse components are transmitted continuously over said channel and said signals including those frequencies representative of the fine components are transmitted alternately over said channel, and means at the receiver station to separate said transmitted signals into separate signals representative of the coarse components and fine components of said two video signals and means for recombining said signals to give composite signals representative respectively of said first and second video signals.

6. A transmission system comprising a transmitter station including a first and a second pair of transmission paths, one path of each pair including a filter capable of passing the low frequency components of a video signal and a modulator, the other path of each pair being capable of passing the complete band of video signal frequencies, means for applying a first and a second video signal to the inputs respectively of said first and second pairs of transmission paths, a first two-pole switching means connected to the first and a second two-pole switching means connected to the second of said pairs of transmission paths and joined at a transmitter output terminal so that in one switching position the full frequency band of said first video signal and the low frequency signal of said second video signal appear on the output terminal and in the other switching position the low frequency signal of first video signal and the full frequency band of the second video signal appear on the output terminal, and means for operating said first and second switching means synchronously.

7. A transmission system according to claim 6 including delay means in each of said paths capable of passing the complete band of video signal frequencies, the delay in each said path being of a duration equal to the delay introduced by the filter and modulator in the other path of each said pair.

8. A transmission system according to claim 7 in further combination with a receiving station comprising an input terminal, a third and a fourth pair of transmission paths, each pair including in one path a filter capable of passing the low frequency components of a video signal and a modulator, and in the other path of each pair delay means capable of passing the full frequency band of a video signal, a third two-pole switching means connected to the third and a fourth two-pole switching means connected to the fourth of said pairs of transmission paths and joined at said input terminal whereby in one switching position the received signal is applied to the path in one said pair capable of passing the low frequency components and the path in the other pair capable of passing the full frequency band of a video signal and in the other switching position the received signal is applied to the other paths in said pairs, means to operate said third and fourth switching means synchronously, and means connected to said each said pair to utilize the signal output of said pairs.

9. A transmission system comprising a transmitter station including a first and second pair of transmission paths, one path of each pair including a filter capable of passing the low frequency components of a video signal, the other path of each pair including a filter capable of passing the high frequency components of a video signal, means for applying a first and a second video signal to the inputs respectively of said first and second pairs of transmission paths, means connecting said low frequency paths to output means, a first two-pole switching means connected to said high frequency paths of said pairs of transmission paths and joined to said output means whereby the low frequency components of said first and second video signals are continuously applied to said output means and the high frequency components of one said video signal are applied to said output means with the switch in one position and the high frequency components of the other video signal are applied to the output means with the switch in the other position, and means for operating said switch.

10. A transmission system according to claim 9 in further combination with a receiving station including input means, means connected to said input means for separately presenting said low frequency components of said first and said second video signals, means connected to said input means for presenting said high frequency components, a second two-pole switch connected to said high frequency means, means for operating said second two-pole switch in synchronism with said first two-pole switch whereby the high frequency components of said first and second video signals are separately presented at the respective poles of said switch and means for recombining the low frequency components and the high frequency components of said first video signal and the low frequency and the high frequency components of said second video signal.

11. A transmission system comprising a transmitter station including a first and a second pair of transmission paths, one path of each pair including a filter capable of passing the low frequency components of a video signal and one of said paths including further a modulator, the other path of each pair including a filter capable of passing the high frequency components of a video signal, means for applying a first and a second video signal to the inputs respectively of said first and second pairs of transmission paths, a transmission channel, means including a modulator for applying the signals from said low frequency paths to said transmission channel, means including a two-pole switch for applying the signals from said high frequency paths to said transmission channel wherein the high frequency portions of one said video signal are applied with the switch in one position and the high frequency portions of said other video signal are applied with the switch in the other position, and means for operating said switch.

12. A system for transmitting a plurality of television video signals, each having high frequency components and low frequency components, over a single television channel which channel correspondingly includes a high frequency band and a low frequency band, said system comprising means for separating the low frequency components from the high frequency components of said signals, means for transmitting the high frequency components of each signal over the high frequency band on a time-sharing basis and means for effecting the simultaneous transmission of the low frequency components of said signals on the low frequency band on a frequency interlace basis.

13. A system for transmitting and reproducing a plurality of first television video signals comprising means for separating the low frequency and the high frequency components of said signals, means for interlacing the low frequency components of said signals whereby said signals are transmitted over the same frequency band channel, means for transmitting the high frequency components of both said signals over another frequency band channel on a time sharing basis, and means at a receiver for separating the low frequency components and the high frequency components of each said signal and recombining the low and the high frequency components of each said first television signal to produce other television video signals representative respectively of said first television video signals.

References Cited in the file of this patent

UNITED STATES PATENTS

| | | |
|---|---|---|
| 2,007,809 | Nicolson | July 9, 1935 |
| 2,657,253 | Bedford | Oct. 27, 1953 |
| 2,677,720 | Bedford | May 4, 1954 |
| 2,686,831 | Dome | Aug. 17, 1954 |
| 2,696,523 | Theile | Dec. 7, 1954 |